(12) United States Patent
Chen et al.

(10) Patent No.: US 11,220,447 B2
(45) Date of Patent: Jan. 11, 2022

(54) COMBINED SEDIMENTATION TANK

(71) Applicant: Central & Southern China Municipal Engineering Design & Research Institute Co., Ltd., Hubei (CN)

(72) Inventors: Caigao Chen, Hubei (CN); Xue Gao, Hubei (CN)

(73) Assignee: Central & Southern China Municipal Engineering Design & Research Institute Co., Ltd., Wuhan (CN)

( * ) Notice: Subject to any disclaimer, the term of this patent is extended or adjusted under 35 U.S.C. 154(b) by 408 days.

(21) Appl. No.: 16/286,529

(22) Filed: Feb. 26, 2019

(65) Prior Publication Data

US 2019/0276343 A1   Sep. 12, 2019

(30) Foreign Application Priority Data

Mar. 8, 2018 (CN) .......................... 201810191266.7

(51) Int. Cl.
*C02F 9/00* (2006.01)
*C02F 1/52* (2006.01)
*C02F 1/00* (2006.01)
*C02F 3/02* (2006.01)

(52) U.S. Cl.
CPC ................ *C02F 9/00* (2013.01); *C02F 1/001* (2013.01); *C02F 1/52* (2013.01); *C02F 3/02* (2013.01); *C02F 2001/007* (2013.01); *C02F 2301/08* (2013.01)

(58) Field of Classification Search
CPC .......... C02F 1/001; C02F 1/52; C02F 1/5281; C02F 3/02; C02F 9/00; C02F 2001/007; C02F 2201/002; C02F 2301/08
See application file for complete search history.

(56) References Cited

U.S. PATENT DOCUMENTS

| | | | |
|---|---|---|---|
| 6,447,686 B1* | 9/2002 | Choi | C02F 1/52 |
| | | | 210/199 |
| 2005/0150840 A1* | 7/2005 | Vion | C02F 1/24 |
| | | | 210/703 |
| 2017/0165594 A1* | 6/2017 | Pazan | C02F 1/5281 |

* cited by examiner

*Primary Examiner* — Dirk R Bass

(57) ABSTRACT

A combined sedimentation tank including a flocculation tank, a transition zone and a sedimentation tank which are sequentially connected along a direction that water flows. The sedimentation tank includes a sloping plate zone and a horizontal flow zone. The length of the sloping plate zone is a quarter of the total length of the sedimentation tank. A return pipe is arranged at the bottom of the sloping plate zone. Some of sludge in the sloping plate zone is returned to the flocculation tank through the return pipe to increase the concentration of the suspended solids in the flocculation tank, thereby forming the sediments.

7 Claims, 2 Drawing Sheets

COMBINED SEDIMENTATION TANK

CROSS-REFERENCE TO RELATED APPLICATIONS

This application claims the benefit of priority from Chinese Patent Application No. CN201810191266.7, filed on Mar. 8, 2018. The content of the aforementioned application, including any intervening amendments thereto, is incorporated herein by reference in its entirety.

TECHNICAL FIELD

The present invention relates to water treatment technology, and in particular to a combined sedimentation tank.

BACKGROUND OF THE INVENTION

Currently, conventional sedimentation tanks for water treatment mainly include horizontal flow sedimentation tanks, sloping tube (plate) sedimentation tanks and high-density sedimentation tanks. Horizontal flow sedimentation tanks are widely used in large and medium-sized water plants because of low cost, simple construction, convenient management and stable treatment effect. However, the horizontal flow sedimentation tanks have the following defects.

1. For raw water with large sediment concentration, a density current is generated because of a great difference in density between water in upper and lower portions of the horizontal flow sedimentation tank. A higher flow velocity in the lower portion causes the settled flocs floats again after reaching the marginal wall, resulting in the flotation of sediments. Flocs are entrained by the effluent, thus affecting the water quality.

2. For raw water with low turbidity, fine colloidal impurities are uniformly dispersed in water, which has strong accumulation and dynamic stability. There are few flocs in the raw water that are fine and light, so it is difficult to form the sediments of large flocs. Such flocs are easy to penetrate through the filter layer of a filter tank, thus affecting the water quality of effluent.

In view of the above defects, the sloping tube sedimentation tanks can effectively reduce the flotation of the sediments and improve the sedimentation efficiency. However, the sloping tube sedimentation tanks have a poor adaptability to the change in turbidity of raw water, leading to unstable effluent water quality. For raw water with low turbidity, the effluent water quality is worse. The high-density sedimentation tanks have the advantages of high treatment efficiency and specific yield and strong adaptability. However, the high-density sedimentation tanks require many mechanical equipments, higher energy consumption, complicated operation and management and high cost. Thus, the conventional sedimentation tanks fail to overcome all of the above problems, so that their uses are limited. Therefore, the present invention intends to design a combined sedimentation tank to overcome the defects of the existing single sedimentation tank.

SUMMARY OF THE INVENTION

In order to solve the above technical problems, the present invention provides a combined sedimentation tank with good performances in sedimentation, sludge discharge, sedimentation efficiency and cleanliness of settled water considering the advantages and disadvantages of various sedimentation tanks in the art.

The present invention is directed to a combined sedimentation tank (CST), particularly, a sloping plate-horizontal flow combined sedimentation tank with sludge return.

The combined sedimentation tank (CST) includes a flocculation tank, a transition zone and a sedimentation tank. Raw water flows into the flocculation tank through a water inlet, and after flocculation it enters the transition zone for sedimentation. The sediments entrained by the water are settled in the transition zone, where some of sediments are discharged through a sediment discharge pipe, and the rest sediment enters the sedimentation tank with the water. The sedimentation tank includes a sloping plate zone and a horizontal flow zone. The sloping plate zone is arranged at a front portion of the sedimentation tank to collect flocs for generating a return. A sloping plate is arranged in the sloping plate zone in a lateral flow manner. A plurality of sludge hoppers and a plurality of sludge collection tubes are arranged below the sloping plate to collect large flocs which are quickly settled. An end of return pipe is arranged at a sludge outlet, and the other end of the return pipe is connected to the water inlet. Thus the flocs collected in the sloping plate zone can be returned to the flocculation tank, which improves the flocculation effect. The water in the sloping plate zone enters the horizontal flow zone to be settled, and then is discharged out of the tank through a catch basin.

In an embodiment, when a length of the sloping plate zone is a quarter of a total length of the sedimentation tank, a maximum sedimentation efficiency is achieved. Flocs with high concentration are collected and returned to the flocculation tank to increase the concentration of suspended solids in inlet water, so as to achieve the preferable return effect.

In an embodiment, some of sludge collected in the sloping plate zone is returned to the flocculation tank. The return ratio of sludge is adjusted according to the turbidity of raw water, which is generally about 10%. It is preferable to keep the turbidity of water in the flocculation tank at around 300 NTU after mixed with the returned sludge, so that an adsorption bridging action can be fully utilized during sedimentation, resulting in better separation effect with less reagents consumption. The rest sludge is discharged together with the sludge in the horizontal flow zone.

In an embodiment, the horizontal flow zone follows a conventional mode. A finger-like catch basin is arranged at an end of the horizontal flow zone to exert the advantage of strong adaptability to the turbidity of raw water, guaranteeing quality of effluent.

The present invention provides a combined sedimentation tank, as compared to the prior art, it overcomes the defects of the single sedimentation tank. The problem of flotation of sediment is solved. The adaptability to changes in turbidity of raw water is improved, and the quality of effluent is stabilized. It further has the advantages of low cost and easy operation and management. It can not only be applied to the construction of new sedimentation tanks, but also be applied to the reconstruction of old sedimentation tanks with low cost. The specific features are described as follows.

1. Sloping plate is arranged in the sloping plate zone, which improves the sedimentation efficiency. A mass of flocs of large size are settled quickly, and some flocs flow into the follow-up horizontal flow zone. The density difference between water in the upper and lower portions is reduced, reducing the problem of flotation of sediments.

2. Return of some of sludge in the sloping plate zone increases the concentration of the suspended solids in the flocculation tank to destabilize the colloidal particles and form the sediments, especially for the raw water with low turbidity. The sludge contains a certain amount of coagulant and flocculant, which can reduce the consumption of reagents by 50%.

3. In the horizontal flow zone, buffer for the water changes is provided as the horizontal flow sedimentation tank, and therefore the sedimentation system has a good production capacity.

4. The present invention combines the advantages of the horizontal flow sedimentation tank with stable effluents and the sloping plate tank with high flocculation and sedimentation efficiency. In addition, a return system is additionally provided to improve the coagulation and sedimentation, so that the turbidity of water is reduced from about 10 NTU to about 5 NTU.

5. As compared to the high-density sedimentation tanks, the combined sedimentation tank can be used in combination with any type of flocculation tanks. It is convenient and flexible to use and needs less mechanical equipments. It further has the advantages of simple operation and management and low cost.

Figure 1:
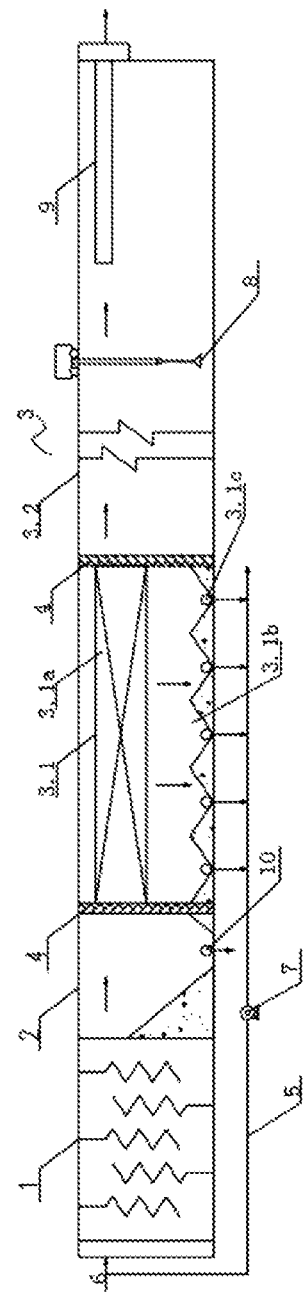
FIG. 1 is a schematic diagram of the combined sedimentation tank according to the present invention.

In the drawings: 1, flocculation tank; 2, transition zone; 3, sedimentation tank; 3.1, sloping plate zone; 3.1a, sloping plate; 3.1b, sludge hopper; 3.1c, sludge collection tube; 3.2, horizontal flow zone; 4, perforated wall; 5, return pipe; 6, water inlet; 7, sludge pump; 8, sludge scraper; 9, catch basin; 10, sediment discharge pipe.

DETAILED DESCRIPTION OF EMBODIMENTS

The present invention will be further described below in detail with reference to the accompanying drawings and embodiments, from which the purpose, technical solutions and advantages of the present invention become more apparent and clearer. It is understood that the specific embodiments described herein are merely illustrative of the invention, but not to limit the invention.

Figure 2:
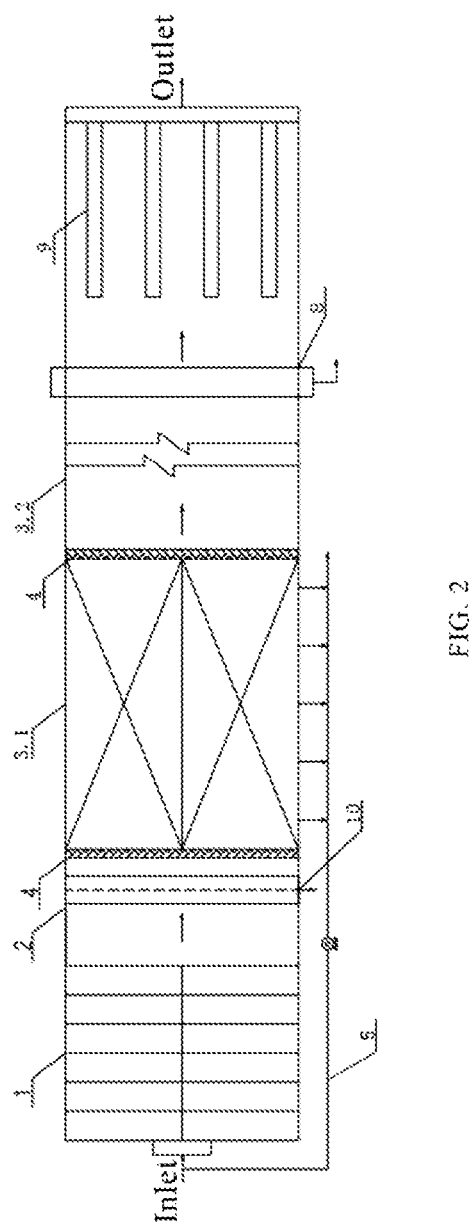
FIG. 2 is a plan view of the combined sedimentation tank according to the present invention.

As shown in FIGS. 1-2, a combined sedimentation tank (hereinafter referred to as CST) includes a flocculation tank 1, a transition zone 2 and a sedimentation tank 3 which are sequentially connected along a direction that water flows. The sedimentation tank 3 includes a sloping plate zone 3.1 and a horizontal flow zone 3.2. The sloping plate zone 3.1 is arranged between the transition zone 2 and the horizontal flow zone 3.2. Two ends of the sloping plate zone 3.1 respectively communicate with the transition zone 2 and the horizontal flow zone 3.2 through a perforated wall 4. A return pipe is arranged at a bottom of the sloping plate zone 3.1, where an end of a return pipe 5 is connected to a sludge outlet of the sloping plate zone, and the other end of the return pipe 5 is connected to a water inlet 6.

Further, when the length of the sloping plate zone 3.1 is a quarter of the total length of the sedimentation tank 3, a maximum sedimentation efficiency is achieved. A higher concentration of flocs in the front section is collected to return to the flocculation tank to increase the concentration of the suspended solids in inlet water, thereby achieving an optimal effect.

Further, a sloping plate 3.1a is arranged in a lateral flow manner in the sloping plate zone 3.1. Sludge hoppers 3.1b and sludge collection tubes 3.1c are arranged below the sloping plates 3.1a. A sludge outlet of the sludge collection tube 3.1c communicates with an inlet of the return pipe 5. A sludge pump 7 is arranged at the return pipe 5 for some sludge return from the sloping plate zone 3.1 to the flocculation tank.

Further, the horizontal flow zone 3.2 is provided with a sludge scraper 8 that moves along a length of the horizontal flow zone 3.2. The sludge scrapper 8 is a travelling scraper. A catch basin 9 is arranged in the horizontal flow zone 3.2 and communicated to a water outlet of the horizontal flow zone 3.2.

Further, a sediment discharge pipe 10 is arranged at the bottom of the transition zone 2. The flocculation tank is a baffled flocculation tank, a folded-plate flocculation tank, a grid flocculation tank or a mechanical flocculation tank.

In practical use, the raw water with reagent added enters the flocculation tank 1 through the water inlet 6, and then enters the transition zone 2 after flocculation. A great number of sediments in the raw water is settled in the transition zone 2, and then discharged through the sediment discharge pipe 10. The discharged water passes through the perforated wall 4 to be evenly distributed and then enters the sloping plate zone 3.1. The sloping plate 3.1a is provided in the sloping plate zone in a lateral flow manner. The sludge hoppers 3.1b and the sludge collection tubes 3.1c are arranged below the sloping plate 3.1a to collect the flocs of large size which are quickly settled. Some of sludge collected in the sloping plate zone is returned to the flocculation tank 1 through the return pipe 5, and the rest sludge is discharged together with the sludge in the horizontal flow zone 3.2.

In this embodiment, the returned sludge in the return pipe 5 mainly comprises a high concentration of the coagulated flocs, but contains no sediment. The sludge return can increase the concentration of the suspended solids in the flocculation tank 1 to produce an adsorption bridging effect, effectively improving the flocculation in raw water with low turbidity. Moreover, the sludge contains a certain amount of coagulant and flocculant, which can reduce the total consumption of reagents.

In this embodiment, a return pipe 5 is arranged at the bottom of the sloping plate zone 3.1. The return rate of sludge is adjusted according to the turbidity of the raw water. It is suitable to keep the turbidity of water in the flocculation tank at around 300 NTU after mixed with the returned sludge. The water in the sloping plate zone 3.1 flows to the horizontal flow zone 3.2 through the perforated wall 4. The horizontal flow zone follows a conventional mode where a sludge scraper 8 is used to discharge sludge. A finger-like catch basin 10 is arranged at an end of the horizontal flow zone 3.2 to collect the treated water and discharge the treated water through the water outlet pipe.

In this embodiment, the length of the sloping plate zone 3.1 is a quarter of the total length of the sedimentation tank 3. The total hydraulic retention time of the sedimentation tank 3 is 1.5-2 hours. The water flow velocity in the sloping plate zone 3.1 is 13-20 mm/s. The water flow velocity in the horizontal flow zone 3.2 is 10-17 mm/s. The depth of the sedimentation tank 3 is 3.5-4.0 m. The height of the sloping plate 3.1a is 1.4-1.6 m. The sloping plate 3.1a has a inclination of 60°. The gap between the sloping plates 3.1a is 5-10 cm.

When the flow rate of the inlet water is 1500 m$^3$/h, the retention time of the inlet water is 2 h, the depth of the CST is 4 m, and the turbidity of the inlet water is 65 NTU, the turbidity of effluent after treatment by the CST can be maintained below 3 NTU. The treatment effect is far better than the single sedimentation tank.

It should be understood that portions not described in the specification are either prior art or general knowledge. The present invention is only intended to illustrate the invention but not to limit the scope of the invention. The equivalents and modifications of the invention made by those skilled in the art fall within the scope of appended claims.

What is claimed is:

1. A combined sedimentation tank, comprising:
a flocculation tank,
a transition zone, and
a sedimentation tank;
wherein the sedimentation tank comprises a sloping plate zone and a horizontal flow zone which are connected with each other; the sloping plate zone is arranged between the transition zone and the horizontal flow zone; a sloping plate is provided in the sloping plate zone; one end of the sloping plate zone communicates with the transition zone through a perforated wall and an other end of the sloping plate zone communicates with the horizontal flow zone through another perforated wall; a return pipe is arranged at a bottom of the sloping plate zone; an end of the return pipe is connected to a sludge outlet of the sloping plate zone; and the other end of the return pipe is connected to a water inlet;

a sediment discharge pipe is arranged at a bottom of the transition zone for discharging sediment;
the horizontal flow zone is provided with a sludge scraper that moves along a length of the horizontal flow zone to discharge sludge deposited at a bottom of the horizontal flow zone.

2. The combined sedimentation tank of claim 1, wherein a length of the sloping plate zone is a quarter of a total length of the sedimentation tank.

3. The combined sedimentation tank of claim 2, wherein a plurality of sludge hoppers and a plurality of sludge collection tubes are arranged below the sloping plate; a sludge outlet of each of the plurality of sludge collection tubes communicates with an inlet of the return pipe.

4. The combined sedimentation tank of claim 3, wherein the return pipe is provided with a sludge pump.

5. The combined sedimentation tank of claim 1, wherein the sludge scraper is a travelling scraper.

6. The combined sedimentation tank of claim 5, wherein a catch basin is arranged in the horizontal flow zone and connected to a water outlet of the horizontal flow zone.

7. The combined sedimentation tank of claim 1, wherein the flocculation tank is a baffled flocculation tank, a folded-plate flocculation tank or a grid flocculation tank.

* * * * *